Patented Dec. 3, 1935

2,023,375

UNITED STATES PATENT OFFICE 2,023,375

PROCESS OF MANUFACTURING REFINED PRODUCTS FROM MINERAL OILS

Willem J. D. van Dijck, The Hague, Netherlands, assignor to Shell Development Company, San Francisco, Calif., a corporation of Delaware No Drawing. Application December 27, 1930, Serial No. 505,212. In the Netherlands January 9, 1930

20 Claims. (Cl. 196—13)

The invention relates to a process of manufacturing, by extraction, refined products from mineral oils as also products of distillation, cracking, hydrogenation and destructive hydrogenation.

It has already been proposed to use nitrobenzol as an extracting agent for the lubricant fraction of a certain petroleum. Furthermore, on investigation of the solvent action of acetonitril on Inglewood crude petroleum it was found that no extraction took place since the volume of the solvent layer appeared to be constant.

It has now been found that in general hydrocarbons in which a nitro or nitril group has been introduced are suitable extracting agents in refining hydrocarbon oils such as mineral oils or products obtained therefrom by distillation, cracking, or any other physical or chemical treatment. It has further been found that the lower terms of the hydrocarbons, for example nitromethane and acetonitril, are very active, and also that, although the selectivity is reduced, by increasing the number of carbon atoms the dissolving property is considerably enhanced, so that these substances are particularly suitable for the treatment of heavier oils and the like. Thus a good separation with the aid of nitrobenzol or benzonitril is obtained only in the case of heavy cylinder oil. It may be found desirable, therefore, as a general rule, to employ light solvents for extraction of light hydrocarbon mixtures, and heavier solvents for extraction of heavier mixtures.

It has further appeared that simultaneous introduction into molecules already containing nitro or nitril groups of other groups or atoms is possible to a limited extent. Thus, for instance, methylrhodanide (which is methylthiocyanate) is suitable as a selective solvent. In the introduction, however, the polar character of the molecule should be maintained as far as possible. In order to improve the dissolving property of the lower terms of the extracting agents according to the invention in the extraction of heavy hydrocarbons, a suitably selected diluent may be added, such as benzol or some other aromatic hydrocarbon or an ether, whilst also mixtures of the extracting agents may be used.

The advantages of the substances to be used according to the invention in respect to what is known for this purpose are their eminent selectivity, which decreases but slowly, even at more elevated temperatures, their relatively great stability and their low boiling-point, as a result of which they can easily be recovered.

*Example I.*—A mineral oil which has been treated with liquid sulphur dioxide so as to remove aromatic hydrocarbons therefrom, is extracted with nitromethane at 100° centigrade. Before extraction the oil had a $n_D^{20}=1.4969$ and contained 35.3% sulphonatable constituents. The oil thus refined had a $n_D^{20}=1.4880$ and appeared to contain 23.9 per cent by weight of sulphonatable constituents. The nitromethane extract appeared to have a $n_D^{20}=1.5191$ and a content of sulphonatable constituents of 61.2 per cent by weight.

From the above it follows that nitromethane has a selective extraction power for certain sulphonatable substances.

It will be understood that the extraction described above yields a highly refined product, the qualities of which are considerably improved with respect to the original oil, which in itself due to the action of the liquid sulphur dioxide already presents a product of high quality. The improvement mainly consists in a greater stability of the oil against oxidation influences, as will be apparent from the following data: After subjecting the original oil during 600 hours to an oxidation test it had a sludge content of 0.12 and an acid value of 0.08, whereas the oil treated with nitromethane after the same time appeared to have a sludge content of 0.04 and an acid value of 0.05.

From the above it can be concluded that nitromethane has a remarkable extractive power for those sulphonatable constituents of the oil which render the oil less stable against oxidation.

*Example II.*—The same oil as described in Example I was extracted at 73° centigrade with ten times its weight of propionnitril, whereby 17 per cent by weight of an extract was obtained having a $n_D^{20}=1.5132$ and containing about 54.5 per cent by weight of sulphonatable substances. The refined oil appeared to have a remarkable stability in comparison with the untreated oil.

*Example III.*—The same oil as described in the foregoing examples was extracted at 98° centigrade with 500% by weight of monochloroacetonitril, whereby 16.9 per cent by weight of an extract was obtained containing 60 per cent by weight of sulphonatable constituents and having a $n_D^{20}=1.5118$.

*Example IV.*—An oil obtained by the destructive hydrogenation of a cylinder oil was extracted at 85° centigrade with 500 per cent by weight of monochloroacetonitril; 17.2 per cent by weight of an extract was obtained having a $n_D^{20}=1.5158$, whereas the untreated oil had a $n_D^{20}=1.4954$.

From the above examples, and particularly from the Examples I and IV, it is evident (particularly from the changes produced by extraction in refracting indices) that the disclosed solvents are preferential solvents for what is arbitrarily termed in the industry the "naphthenic" portion of a mineral oil, which as such is differentiated from the "paraffinic" portion; in this connection it may be noted, that Vlugter, Waterman and van Westen in their article "Examining Mineral Oils", published in the Journal of the Institution of Petroleum Technologists, 18, 107, 738 (1932) pointed out that the refracting indices of paraffinic hydrocarbons are lower than those of the corresponding naphthenic or aromatic hydrocarbons. The tests given in the above examples, demonstrate, therefore, that the less soluble portions of the oils extracted with solvents of this invention are not only more stable against oxidation than the original oils, but are also more paraffinic and therefore have flatter temperature viscosity curves than said original oils. The fact that they are more resistant against oxidation or sulfonation also indicates that they are more paraffinic.

It should be understood that the process according to the invention is in no way limited to the examples described above or to any special temperature range or method of extraction. My invention broadly resides in the discovery that the extracting agents mentioned above, to wit hydrocarbons having a nitro or nitril group introduced therein, have a remarkable selective extractive effect on hydrocarbon oils of the kind described, the qualities of which can be considerably improved by a suitable treatment with said agents, certain undesired constituents of the oil to be refined being thereby removed. The temperature at which the extraction is effected depends on the nature of the hydrocarbon oils to be refined, the extracting agent to be used and the desired degree of refining. Said temperature can be easily ascertained by experiment. It is also possible to carry out the extraction under pressure if desired.

What I claim is:

1. In the art of refining mineral oils, the process which comprises extracting the oil with a solvent selected from the group consisting of: organic compounds other than a nitrated monocyclic aromatic hydrocarbon, which contain an —$NO_2$ group, organic compounds other than a thiocyanate which contain a —CN group, and methyl thiocyanate.

2. In the art of refining mineral oils, the process which comprises extracting the oil with a solvent selected from the group consisting of: hydrocarbons other than a nitrated monocyclic aromatic hydrocarbon in which a nitro group has been introduced, hydrocarbons in which a nitril group has been introduced, hydrocarbons in which a nitro group has been introduced together with another radical introduced between the hydrocarbon molecule and the nitro group, hydrocarbons other than a thiocyanate in which a nitril group has been introduced together with another radical introduced between the hydrocarbon molecule and the nitril group, and methyl thiocyanate.

3. In the refining of hydrocarbon oils of the kind described, the step which comprises adding thereto an extracting agent containing a lower aliphatic hydrocarbon, in the molecule of which a group selected from the nitro and nitril groups has been introduced, removing the extracting agent together with the substances dissolved therein and recovering a refined hydrocarbon oil.

4. A process as claimed in claim 3, wherein the extraction is carried out in the presence of a diluent.

5. In the refining of a hydrocarbon oil of the kind described, the process which comprises adding to said oil an extracting agent other than a nitrated mono-cyclic aromatic hydrocarbon, which agent contains a hydrocarbon in the molecule of which a group selected from the nitro and nitril groups has been introduced, removing the extracting agent together with the substances dissolved therein and recovering a refined hydrocarbon oil.

6. In the refining of a hydrocarbon oil of the kind described, the process which comprises adding to said oil an extracting agent other than a nitrated mono-cyclic aromatic hydrocarbon or a thiocyanate, which agent contains a hydrocarbon in the molecule of which a group selected from the nitro and nitril groups has been introduced together with another group introduced between the hydrocarbon molecule and the nitro or nitril radical, removing the extracting agent together with the substances dissolved therein and recovering a refined hydrocarbon oil.

7. In the refining of a hydrocarbon oil of the kind described, the process which comprises adding to said oil an extracting agent containing methylthiocyanate, removing the extracting agent together with the substances dissolved therein and recovering a refined hydrocarbon oil.

8. In the art of refining mineral oils containing paraffinic and naphthenic hydrocarbons, the process which comprises bringing the oil into contact with benzonitrile, thereby effecting solution of a portion of the oil richer in naphthenic hydrocarbons in the benzonitrile, separating the benzonitrile solution of oil from the oil so treated, and removing the benzonitrile from each of the fractions so obtained, thereby to obtain fractions of the oil respectively richer in paraffinic and naphthenic hydrocarbons.

9. The method of producing paraffinic lubricating oil from mixed base crude, which comprises distilling the crude and bringing a portion thereof into contact with benzonitrile, thereby partially dissolving the oil, separating the benzonitrile solution of oil from the oil so treated, and removing the benzonitrile from the treated oil.

10. In the art of refining mineral oils containing paraffinic and naphthenic hydrocarbons, the process which comprises separating the oil into fractions respectively richer in paraffinic and naphthenic compounds by extracting said oil with benzonitrile.

11. In the art of refining mineral oils containing paraffinic and naphthenic hydrocarbons, the process which comprises fractionally extracting the oil with benzonitrile to produce fractions of the oil respectively richer in paraffinic and naphthenic compounds.

12. In the art of refining mineral lubricating oil containing paraffinic and naphthenic hydrocarbons, the step of fractionally extracting the oil with benzonitrile to effect a separation of fractions respectively richer in paraffinic and naphthenic compounds.

13. In a process for separating a viscous mineral oil containing paraffinic and naphthenic hydrocarbons into fractions which are respectively richer in naphthenic hydrocarbons and paraffinic hydrocarbons other than wax, the step which comprises extracting the oil with benzonitrile.

14. In a process for separating viscous mineral oil, liquid at ordinary temperatures, containing paraffinic and naphthenic hydrocarbons, into fractions respectively richer in paraffinic and naphthenic hydrocarbons, the step which comprises extracting the oil with benzonitrile.

15. The process of treating a viscous fraction of a crude oil of one type containing paraffinic and naphthenic hydrocarbons to procure a fraction having the quality of a corresponding fraction of a crude oil of different type having a greater content of paraffinic hydrocarbons, which comprises extracting the viscous fraction with benzonitrile, and separating the oil so treated into portions respectively richer in paraffinic and naphthenic hydrocarbons.

16. The process of treating a viscous fraction of a mixed base crude oil to procure a fraction having the quality of a corresponding fraction of a paraffinic base crude, which comprises extracting the viscous fraction with benzonitrile, and separating the oil so treated into portions respectively richer in paraffinic and naphthenic compounds.

17. In the art of refining mineral lubricating oil containing paraffinic and naphthenic hydrocarbons, the step of fractionally extracting the oil with methyl thiocyanate, to effect a separation of fractions respectively richer in paraffinic and naphthenic compounds.

18. In a process for separating viscous mineral oil liquid at ordinary temperature containing paraffinic and naphthenic hydrocarbons into fractions respectively richer in paraffinic and naphthenic hydrocarbons, the step which comprises extracting the oil with methyl thiocyanate.

19. The process of treating a viscous fraction of a crude oil of one type containing paraffinic and naphthenic hydrocarbons to procure a fraction having the quality of a corresponding fraction of a crude oil of different type having a greater content of paraffinic hydrocarbons, which comprises extracting the viscous fraction with methyl thiocyanate, and separating the oil so treated into portions respectively richer in paraffinic and naphthenic hydrocarbons.

20. The process of treating a viscous fraction of a mixed base crude oil to procure a fraction having the quality of a corresponding fraction of a paraffinic base crude, which comprises extracting the viscous fraction with methyl thiocyanate, and separating the oil so treated into portions respectively richer in paraffinic and naphthenic compounds.

WILLEM J. D. van DIJCK.